United States Patent [19]
Chan et al.

[11] Patent Number: 5,995,084
[45] Date of Patent: Nov. 30, 1999

[54] TOUCHPAD PEN-INPUT AND MOUSE CONTROLLER

[75] Inventors: Chow Fong Chan; Maisy Mun Lan Ng; Eng Yue Ong; Xia Geng; Swee Hock Alvin Lim, all of Singapore, Singapore

[73] Assignee: Tritech Microelectronics, Ltd., Singapore, Singapore

[21] Appl. No.: 08/785,739

[22] Filed: Jan. 17, 1997

[51] Int. Cl.$^6$ ........................................ G09G 5/00
[52] U.S. Cl. ........................................ 345/173; 345/174
[58] Field of Search ........................................ 345/156, 157, 345/173, 174, 175; 178/18, 19

[56] References Cited

U.S. PATENT DOCUMENTS

| | | | |
|---|---|---|---|
| 4,196,358 | 4/1980 | Conover et al. | 307/243 |
| 4,616,325 | 10/1986 | Heckenbach et al. | 364/505 |
| 4,656,585 | 4/1987 | Stephenson | 364/424 |
| 4,812,828 | 3/1989 | Nishi et al. | 340/706 |
| 5,150,120 | 9/1992 | Yunus | 341/143 |
| 5,187,481 | 2/1993 | Hiller | 341/131 |
| 5,260,697 | 11/1993 | Barrett et al. | 345/173 |
| 5,266,750 | 11/1993 | Yatsuzuka | 178/19 |
| 5,287,121 | 2/1994 | Louis et al. | 345/179 |
| 5,327,161 | 7/1994 | Logan et al. | 345/157 |
| 5,376,946 | 12/1994 | Mikan | 345/157 |
| 5,420,943 | 5/1995 | Mak | 382/313 |
| 5,446,371 | 8/1995 | Eccleston et al. | 324/121 |
| 5,488,204 | 1/1996 | Mead et al. | 178/18 |
| 5,508,719 | 4/1996 | Gervais | 345/157 |
| 5,543,590 | 8/1996 | Gillespie et al. | 178/18 |
| 5,543,591 | 8/1996 | Gillespie et al. | 178/18 |
| 5,568,409 | 10/1996 | Neoh | 364/702 |

OTHER PUBLICATIONS

"A Hardware and Software Resolution For A Pointing Device" AN 569, in the Embedded Circuit Handbook, Microchip Technology. Inc, 1994.

*Primary Examiner*—Matthew Luu
*Attorney, Agent, or Firm*—George O. Saile; Stephen B. Ackerman; Billy Knowles

[57] ABSTRACT

Systems and methods for the detection of motions of a pointed object upon a writing surface such as a touchpad is disclosed. The motions will be detected and converted in a multiplexing analog-to-digital converter to digital codes representing the location of the pointed object and the pressure of the pointed object upon the touchpad. The location and the pressure will be translated into a pen detect signal indicating the presence of the pointed object upon the touchpad. The pen detect signal will be translated into a stroke signal to interpret a single tap, a double tap, and a tap and drag of the pointed object on the touchpad. The digital codes will be averaged to minimize noise and formed into an absolute coordinates digital code. The absolute coordinate digital code, the pressure digital code, and the pen detect signal will be converted to a touchpad-computer interface protocol. Further, multiple sets absolute coordinates will translated into a relative motion code. The absolute coordinates will be interpreted by an autocursor controller to determine if the pointed object has transited between a workzone and an edgezone of the touchpad to generate an autocursor code. The relative motion code, the stroke signal, and the autocursor code will converted to an industry standard computer input mouse protocol. An autopower control circuit and a battery gauge circuit will determine and control the battery condition.

20 Claims, 6 Drawing Sheets

Move Action touching and moving

*FIG. 4a*

Single Click a tap

*FIG. 4b*

Double Click double tap

*FIG. 4c*

Press Action a tap, followed by touching
without movement

FIG. 4d

Drag Action a tap, followed by touching
and moving

FIG. 4e

TOUCHPAD PEN-INPUT AND MOUSE CONTROLLER

RELATED PATENT APPLICATIONS

TMI96-011,
  Title: A Method and System for Data Averaging For Pen-input Devices,
  Ser. No.: 08/785,629, Filing Date: Jan. 17, 1997,
  Assigned to the Same Assignee as the present invention.

TMI96-012,
  Title: A Command Set For Touchpad Pen-Input Mouse,
  Ser. No.: 08/785,726, Filing Date: Jan. 17, 1997,
  Assigned to the Same Assignee as the present invention.

TMI96-013,
  Title: A Touchpad Pen-input Controller,
  Ser. No.: 08/785,738, Filing Date: Jan. 17, 1997,
  Assigned to the Same Assignee as the present invention.

TMI96-014,
  Title: A Touchpad Mouse Controller,
  Ser. No.: 08/785,724, Filing Date: Jan. 17, 1997,
  Assigned to the Same Assignee as the present invention.

TMI96-020, Inventors:
  Title: Automatic Cursor Motion Control for Touchpad Mouse,
  Ser. No.: 08/815,033, Filing Date: Mar. 14, 1997,
  Assigned to the Same Assignee as the present invention.

TMI96-021,
  Title: Multiplexed Analog-to-Digital Converter For Absolute and Relative Voltage Measurements,
  Ser. No.: 08/785,735, Filing Date: Jan. 17, 1997,
  Now issued as U.S. Pat. No. 5,736,949, Issue Date Apr. 7, 1998
  Assigned to the Same Assignee as the present invention.

BACKGROUND OF THE INVENTION

1. Field Of The Invention

The present invention relates to computer system input devices such as a digitizers referred to as touchpads and more particularly to the systems and methods necessary to acquire signals from such input devices and to convert the acquired signals to digital codes that are transmitted to the computer system.

2. Description of Related Art

Touchpads are small digitizer based devices that are pen input devices to allow a person to write or draw upon the surface of the touchpad and have the signals and codes from a controller to be interpreted by a computer system. The touch pad digitizers may be of three types, capacitive, resistive and electromagnetic.

Figure 1:
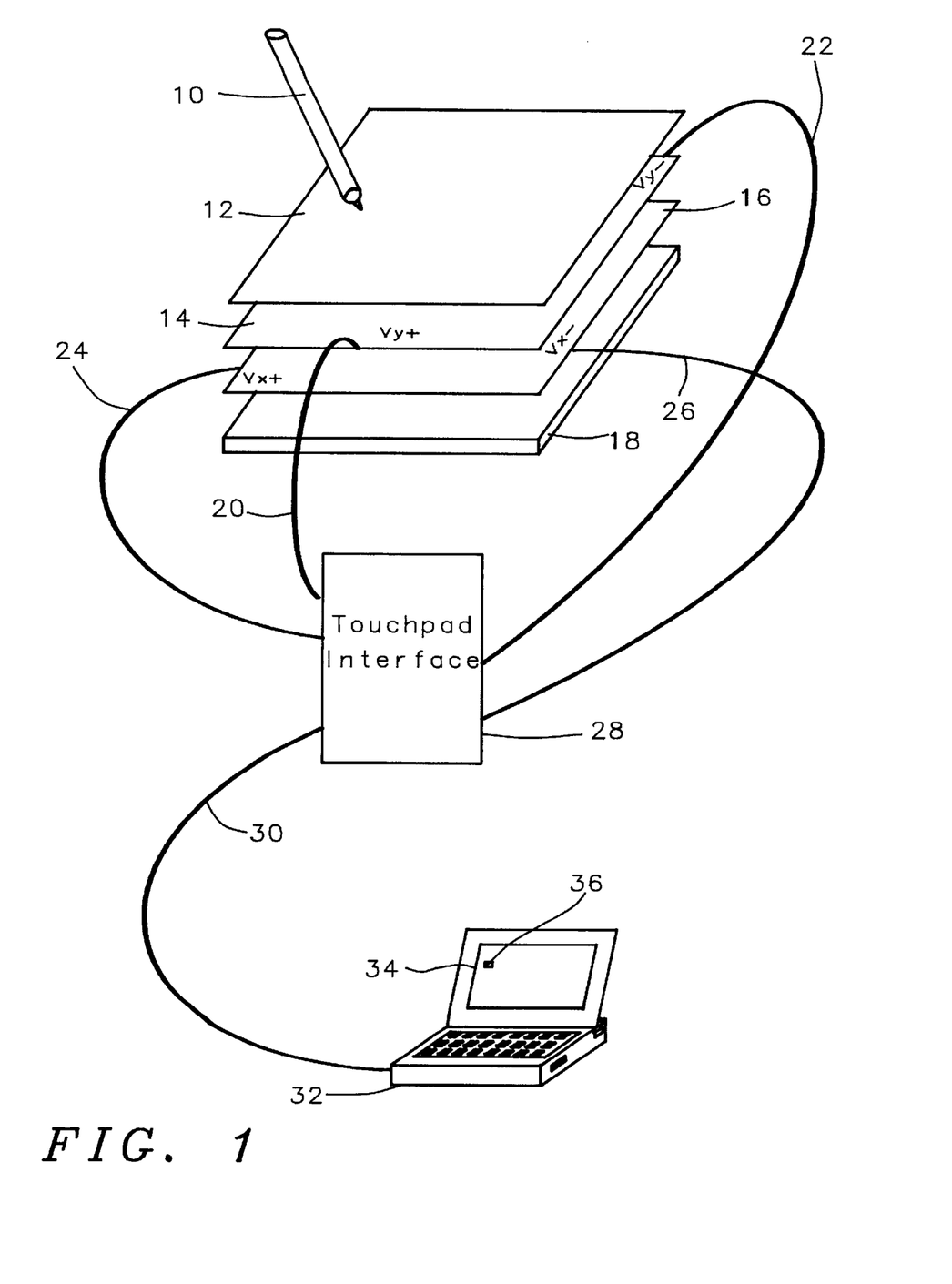
FIG. 1 is an illustration of a resistive film touchpad digitizer as a computer input device.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad is shown in FIG. 1. The resistive touchpad is made up of multiple layers of resistive films and protective layers. The protective hard coating 12 is the surface onto which the pointed object 10 is pressed upon during the writing and drawing. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

Figure 2:
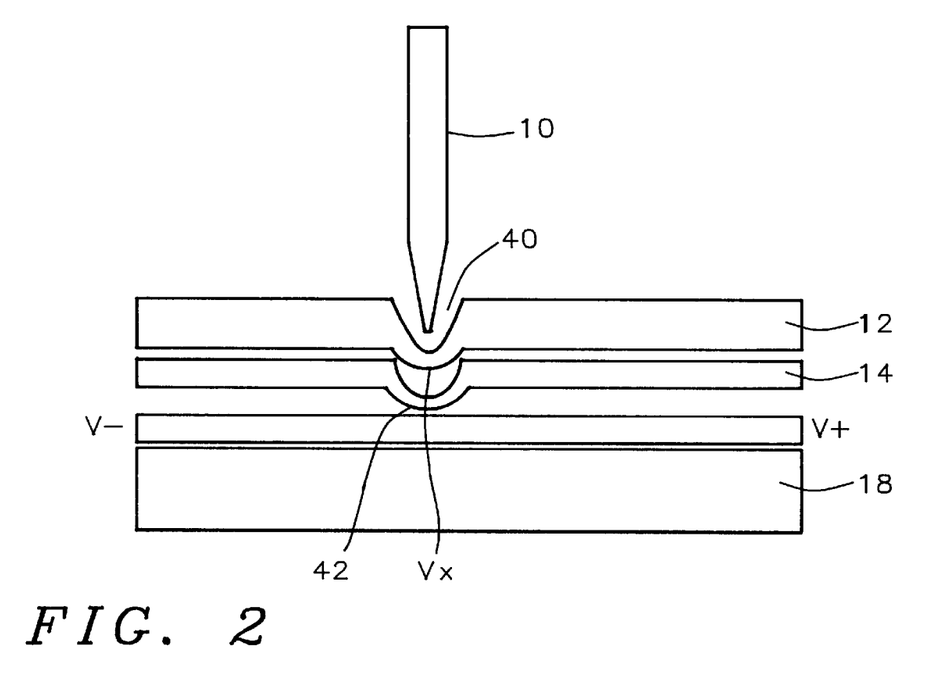
FIG. 2 is a diagram of a resistive film touchpad showing a the location of a pointed object such as a pen or stylus upon the touchpad.

The touchpad interface 28 is connected through the touchpad interface lines 20, 22, 24, and 26. Each line will provide a stimulus such as a current or voltage to the periphery of the X-plane resistive film 16 and the Y-plane resistive film 14. As shown in FIG. 2, as the pointed object 10 is pressed 40 on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 of FIG. 1 is a constant voltage or a constant current. If the stimulus from the touchpad interface 28 of FIG. 1 is a constant voltage the currents through the touchpad interface lines 20, 22, 24, and 26 will be modified according to the position of the pointed object 10 on the touchpad surface 12. However, if the stimulus from the touchpad interface 28 of FIG. 1 is a constant current the voltages between the touchpad interface lines 20, 22, 24, and 26 will be modified according the position of the pointed object 10 on the touchpad surface 12.

Referring back to FIG. 1, the touchpad interface 28 will have a set of analog to digital converters that will sense the change in the analog responses from the touchpad interface lines 20, 22, 24, and 26 and convert them to digital codes indicating the absolute position of the pointed object 10 upon the touchpad surface 12. The digital codes may be transmitted directly to the computer system across the interface 30 and translated to absolute coordinates within the computer system or the touchpad interface 28 may determine the absolute coordinates and transmit them directly to the computer system 32. For the computer system 32 to use the absolute coordinates generated by the touchpad interface 28 to control the movement of the cursor 36 upon the display screen 34, these absolute coordinates must be modified to codes that define the relative motion of the cursor 36. The relative motion will be the speed and direction of the cursor 36 as it is moved across the display screen 34. The modification from absolute coordinates to relative motion information must be done with in an internal mouse emulation program resident within the computer system 32.

A mouse is a point and click device that can be attached to a computer system to control the movement of a cursor on a display screen of the computer system. As described in "A Hardware and Software Resolution For A Pointing Device" AN569, in the Embedded Control Handbook, Microchip Technology Inc., 1994, "a standard motion translator for mice is the use of two slotted wheels, one each for horizontal and vertical direction. Also, there are two optical receivers per slotted wheel. As the slotted wheel turns, infrared beams of light are alternately transmitted and blocked, thereby sending a series of ones and zeros to optical transistor receivers. The two optical receivers are offset from each other such that the resulting signals are 90° degrees out of phase. The phase difference results in two distinctly separate signals. The (mouse) controller interprets what direction the mouse is moving along either axis by the order is receives those two signals." The mouse controller counts the number of pulses per unit time and since the spacing of the slots and bars is uniform and equal in number, the relative velocity along each axis is calculated.

The direction and relative velocity are coded to set of mouse motion digital codes. These codes may be of several formats. Two representative mouse motion digital codes are shown in Table 1. The first is for the Microsoft Mouse from Microsoft Corp. and the second is for the PS/2 Mouse from International Business Machines (IBM).

TABLE 1

| Byte | Bit 7 | Bit 6 | Bit 5 | Bit 4 | Bit 3 | Bit 2 | Bit 1 | Bit 0 |
|---|---|---|---|---|---|---|---|---|
| | | | Microsoft Mouse Format | | | | | |
| 1 | not used | 1 | L | R | V7 | V6 | H7 | H6 |
| 2 | not used | 0 | H5 | H4 | H3 | H2 | HI | H0 |
| 3 | not used | 0 | V5 | V4 | V3 | V2 | VI | V0 |
| | | | IBM PS/2 MOUSE FORMAT | | | | | |
| 1 | Y OVR FLOW | X OVR FLOW | Y SIGN | X SIGN | RES | RES | SB | PB |
| 2 | | | | DELTA X MOTION | | | | |
| 3 | | | | DELTA Y MOTION | | | | |

For the Microsoft Mouse, Bit 5 of Byte 1 indicates if the left button of the mouse is depressed. Bit 4 of Byte 1 indicates if the right button of the mouse is depressed. Bits 3 and 2 of Byte 1 and bits 0 through 5 of the Byte 3 indicate the relative motion of the mouse in the vertical direction. Bits 1 and 0 of the Byte 1 and bits 0 through 5 of Byte 2 indicate the relative motion of the mouse in the horizontal direction. These codes form signed binary numbers. If the vertical signed binary number V0:V7 is positive the mouse is moving downward and if the vertical signed binary number V0:V7 is negative the mouse is moving upward. If the signed binary number H0:H7 is positive the mouse is moving toward the right and if the signed binary number H0:H7 is negative, the mouse if moving toward the left. The magnitudes of the horizontal H0:H7 and the vertical V0:V7 signed binary numbers indicate the relative velocity of the mouse movement.

For the IBM PS/2 mouse, Bit 0 of the first Byte indicates the Primary (in the Microsoft Mouse Left Mouse Button) Mouse button has been pressed. Bit 1 of the first Byte indicates the Secondary (in the Microsoft Mouse Right Mouse Button) Mouse button has been pressed. Bits 2 and 3 of the first Byte are reserved and not used. Bit 4 of the first Byte is an X direction sign bit, where if it is a 1, the X data (or horizontal) is negative and Bit 5 of the first Byte is a Y direction sign bit, where if it is a 1 the Y data (vertical) is negative. Bit 6 and Bit 7 of the first Byte are overflow bits for the X and Y data respectively, indicating that the mouse is traveling faster than the circuitry can reliably calculate its velocity. Byte 2 indicates the total movement (Delta X)of the mouse in the X direction since the last report of movement. Byte 3 indicates the total movement (Delta Y)of the mouse in the Y direction since the last report of movement.

If the touchpad is to emulate the mouse movements, when the cursor 36 is to moved across the display screen 34 for a relatively long distance, the pointed object 10 must be repeated lifted and placed back on the touchpad surface 12 repeatedly giving a "rowing" motion to get the cursor 36 to move the long distance. In traditional mouse operations, if the cursor 36 is to drag an object being displayed upon the display screen 34 a button on the mouse is depressed while the mouse is moved. The button can be held depressed while the mouse is moved in the rowing motion to drag the object across the display screen 34. This is difficult to accomplish on the touchpad. If the pointed object 10 is lifted from the touchpad, the touchpad interface 28 will not be able to communicate the "rowing" motion to indicate that the cursor 36 is to travel a long distance. Also, the touchpad interface 28 will not be able to communicate that there is an intention for the cursor 36 to drag the object on the display screen 34. Additional buttons must be added to the touchpad or special areas within the surface of the touchpad surface 12 in order for the touchpad interface 28 to communicate the desire for the cursor 36 to be moved long distances across the display screen 34 or that the cursor 36 is to drag objects upon the display screen 34.

Touchpads such as described in FIG. I have applications to mobile, portable, or lap top computing systems which are self contained and are powered by a battery power source. The amount of energy remaining in the a battery and the amount of energy consumed by the components of the computer system such as the touchpad and the touchpad interface are factors that must be continuously monitored and regulated to maximize the operation time of these mobile computer systems.

A class of mobile or portable computer systems are known as personal digital assistants. The personal digital assistant uses a touchpad as the primary human input interface. Handwriting must be interpreted to text and drawings to create commands and data to operate the personal digital assistant.

To interpret the hand writing accurately information regarding the pressure of the pen or stylus upon the touchpad and whether the pen is in contact with the touchpad to determine an end of a stroke for the formation of a character. Handwriting interpreting algorithms as currently applied, have only a series of recent history of the absolute coordinates of the location of the pointed object 10 of FIG. 1 upon the touchpad. From these coordinates the handwriting must be interpreted to commands and characters. If the pressure and stroke information is available handwriting interpretation could be more accurate.

U.S. Pat. No. 4,812,828 (Nishi, et al.) discloses a video display processor that is connected to a mouse or a light pen. The processor will place the pulse signals form a mouse to X and Y counters to create codes that represent the amount of movement of the mouse when in the mouse mode. The processor will clock the X and Y counters to create codes that represent the absolute coordinates of a light pen on a display screen, when in the light pen mode. And the processor will clock the X and Y counters until a collision signal, which is generated by associated circuitry, when the animation patterns of the video image are overlapped.

U.S. Pat. No. 5,260,697 (Barrett, et al.) discloses a digitizing tablet overlaying a display screen. The system allows for the simulation of computer input devices such as a mouse and keyboard by a pen upon the digitizing touch tablet. The simulations are accomplished through programs within an interface processor.

U.S. Pat. No. 5,327,161 (Logan, et al.) describes a method to emulate mouse input devices using a program resident within a computer system. A touchpad input device has a controller that generates a digital code that contains the absolute position of a pen or finger on the mouse pad. This requires a special interface that is unique to the touchpad circuitry. Additionally, this patent describes a method for the continuation of cursor movement when a pointed object is touching the touchpad and has been moved on the touchpad to a special border area. The pointed object must be stopped within the border for the continuous motion to be engaged. The direction of the scrolling may be made as a modification of the original direction and velocity of the pen prior to the transiting and stopping within the border area of the touchpad. This modification will be made as a change in the velocity of the movement of the cursor along an axis parallel to the edge of the touchpad adjacent to the border area where the pointed object is resting.

U.S. Pat. No. 5,376,946 (Mikan) describes a circuit using an EPROM to convert signals from a touch screen adhered to a computer display screen to digital codes of the industry standard computer input mouse protocols.

U.S. Pat. No. 5,420,943 (Mak) describes a universal input device for a computer which can be used as a point and click device to read bar codes, a bar code scanner, a mouse, a handwriting input device, or a text scanner. The device has a pen with a CCD array and pad with bar codes and a grids for accomplishing the mouse and bar code scanning functions.

U.S. Pat. No. 5,543,590 (Gillespie, et al.) describes a capacitive sensor system that can detect the location of a finger or stylus on a sensor matrix. The location is determined and translated as electrical signals for use in other circuitry such as a computer system to control a cursor upon a display screen. Further this patent discusses an "edge motion" detection feature that will allow a finger or stylus within a "outer zone" of the sensor matrix to move the cursor to move across a display screen for long distances and avoid the "rowing" motion.

U.S. Pat. No. 5,543,591 (Gillespie, et al.) discloses methods for recognizing tapping, pushing, hopping and zigzagging gestures upon a conductive sensor pad that can be interpreted into cursor control motions such as clicking, double clicking, and click and drag use with computer mouse devices. Further this patent also describes the "edge motion" feature as described in U.S. Pat. No. 5,543,590 (Gillespie, et al.).

U.S. Pat. No. 5,488,204 (Mead) shows a proximity sensor system that has a capacitive touchpad. The capacitance of the touchpad changes with the proximity of an object to the touchpad. As the capacitance changes a voltage changes which is converted to electrical signals representing the X and Y coordinates of the object on the touchpad. A conductive paint brush stylus is used to produce paint-like strokes on a display screen associated with the touchpad. The system also incorporates features that allow the stylus to emulate the actions of a computer mouse including an "edge motion" where a cursor can be moved over long distances without rowing or stroking the stylus.

U.S. Pat. No. 5,266,750 (Yatsuzuka) discloses a tablet input device and circuitry for providing stimulating voltages to the tablet input device and for sensing the response voltages from the tablet input device when the tablet input device is being pressed. The circuitry provides an OFF state wherein power to the tablet is minimized during a waiting period.

U.S. Pat. No. 5,568,409 (Neoh) assigned to the same assignee as the present invention, discloses a circuit for the implementation of the detection of a pointed object upon a touchpad and technique for the removal of power form the circuitry when the pointed object has not been detected upon the touchpad.

U.S. Pat. No. 5,287,121 (Louis, et al.) discloses a graphics input device where a stylus is used on a mechanism resembling a joy stick to provide horizontal graphics signals to a graphics processor and a feature within the mechanism to sense pressure upon the stylus to generate vertical graphics information.

U.S. Pat. No. 5,508,719 (Gervais) discusses a pressure activated pointing device for mobile or portable computing systems, where the output signals are proportional to the pressure on the pointing device.

The use of multiplexers within an analog-to-digital converter circuit is well known in the art. U.S. Pat. No. 5,446,371 (Eccleston, et al.), U.S. Pat. No. 5,150,120 (Yunus), U.S. Pat. No. 5,187,481 (Hiller), U.S. Pat. No. 4,656,585 (Stephenson), U.S. Pat. No. 4,616,325 (Heckenbach, et al.), and U.S. Pat. No. 4,196,358 (Conover, et al.) describe various applications of analog and digital multiplexing circuits for use within analog-to-digital converters.

SUMMARY OF THE INVENTION

An object of this invention is to provide a battery powered touchpad digitizing device to convert electrical responses to the movements of a pointed object such as a pen, stylus, or finger upon a writing surface to digital codes that indicate the location and the pressure being applied by the pointed object to the writing surface.

Another object of this invention is to detect the presence of the pointed object upon the writing surface and to provide a signal indicating such presence.

Yet another object of this invention is the conversion of the digital codes that represent the location of the pointed object upon the touchpad to digital codes that represent the speed and direction of movement of the pointed object upon the touchpad.

Furthermore, another object of this invention is the translation of the digital codes representing the speed and direction of the pointed object upon the touchpad to a set of digital codes that conform to an industry standard mouse protocol.

Another object of this invention is to selectively transmit either the digital codes that represent the location of the pointed object upon the touchpad or the digital codes that conform to the industry standard mouse protocol to the computer system dependent upon a mouse select command.

Still another object of this invention is to reduce variation in the digital codes indicating location of the pointed object due to vibration of the pointed object in the human hand.

Further another object of this invention is to monitor the energy level of the battery powering the touchpad digitizing device and the computer system attached to the touchpad digitizing device.

And still further another object of this invention is to multiplex the monitoring of the battery energy level with the electrical responses from the writing surface to allow the use of a single analog-to-digital converter circuit.

Further still, another object of this invention is interpreting of the digital codes representing the location of the pointed object upon the touchpad to determine when the pointed object has transited from a workzone area of the touchpad to an edgezone area of the touchpad and to translate this to the industry standard protocols indicating the speed and direction of pointed object prior to entry of the edgezone.

Further yet, another object of this invention is the conservation of energy within the circuitry that will implement the aforementioned objects by removal of power from some of the circuits whenever the pointed object has not been detected upon the touchpad for a sufficiently long period of time.

To accomplish these and other object, a battery powered touchpad digitizing computer input device has a touchpad digitizer that has a hard covering surface, a touch input transducer to convert the presence to electrical responses proportional to a distance of the pointed object from peripheral sides is of the surface and proportional to the force of the pointed object upon the hard covering surface. A touchpad driver circuit is connected to the touchpad digitizer to provide an electrical stimulus to the touch input transducer. A pressure sense circuit will convert the electrical responses to a pressure analog signal that is proportional to the force of the pointed object upon the surface.

The touchpad digitizing computer input devices has a multiplexed analog-to-digital converter to accept a plurality of analog signals including the electrical responses and the pressure analog signal, and convert the plurality of analog signals to a plurality of digital codes that include a set of location digital codes representing the location of the pointed object upon the surface and a set of pressure digital codes representing the force of the pointed object upon the surface.

A pen detect circuit receives the electrical responses to create a pen detect signal when the pointed object has been placed upon the touchpad digitizer. The pen detect signal is transferred to a stroke interpreter to determine that the pointed object has made a press and move, a single tap, double tap, a tap and press without movement or a tap and press with movement motion on the touchpad to create a stroke digital code that indicates a single mouse click, a double mouse click, a mouse click and press with no movement, and a mouse click and press with movement respectively.

A touchpad computer interface is connected to the multiplexed analog-to-digital converter, the pen detect circuit, and the stroke interpreter to receive and convert the location digital codes, the set of pressure digital codes, the pen detect signal, the stroke signal to a pen input protocol that contains an absolute location and pressure of the pointed object upon the touchpad digitizer and to transmit the protocol to a computer system for further processing if a pen-input mode is selected, and to convert the location digital codes, the pen detect signal, and the stroke signal to the computer input mouse protocols containing the relative motion and stroke information to control a cursor upon a display screen of the computer system, if a mouse mode is selected. A mode selector to select the pen-input mode if a mode select signal is at a first state and to select the mouse mode if the mode select signal is a second state.

A battery will provide a voltage and a current to the touchpad digitizing computer input device and to the computer system, wherein the battery has a battery sense line is included as one of the plurality of analog signals connected to the multiplexing analog-to-digital converter. The battery sense line is converted to a set of battery power digital codes indicating the level of the voltage and the current of the battery. A battery gauge circuit will calculate from the battery power digital codes, a battery condition set of digital codes, which indicates a charging state of the battery. The battery condition set of digital codes are transmitted to the touchpad interface, which will transmit the battery condition set of digital codes to the computer system;

A power supply control and regulator circuit is connected to the battery to control and regulate the voltage and the current from the battery. An autopower save circuit is connected to the pen detect circuit to receive the pen detect signal, to interpret the pen detect signal to determine if the pointed object has not been in contact with the touchpad surface for a long period of time. An autopower down signal is created that will be transferred to the power supply control and regulator circuit to command removal of the voltage and current from the touchpad input computer device and to restore the voltage and current if the pen detect signal indicates that the pointed object is in contact with the touchpad surface.

DETAILED DESCRIPTION OF THE INVENTION

Figure 3A:
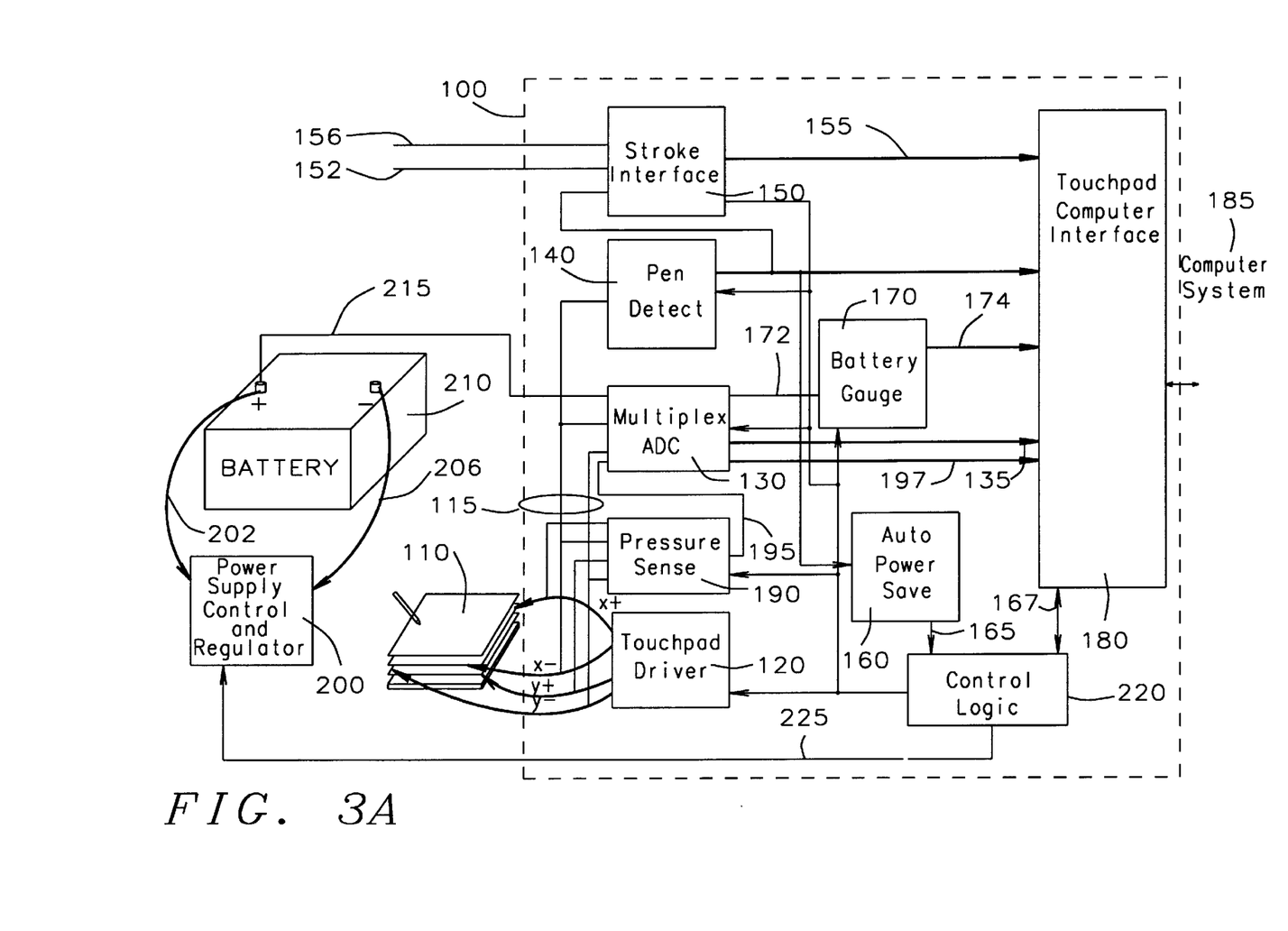
FIG. 3a is a schematic diagram of the battery powered touchpad selectable pen-input/mouse control system of this invention.

Referring to FIG. 3a, an embodiment of a touchpad pen-input/mouse controller 100 has a touchpad driver 120 which will provide a constant current as a stimulus to the touchpad 1 10. The touchpad driver 120 will provide a constant current source connected to the X+ line that is connected to the X-plane of the touchpad 110 and a constant current sink is connected to the X– line that is connected to the opposite side of the X-plane of the touchpad 110. The touchpad driver 120 will provide a second constant current source connected to the Y+ line that is connected to the Y-plane of the touchpad 110 and a second current sink that is connected to the Y– line that is connected to the Y-plane on the side opposite the connection of the Y+ line. As a pointed object such as a finger, stylus, or pen is moved across the touchpad, the resistance of the resistive film as described in FIG. 1 changes causing the voltage at the current sources connected to the X+ line and Y+ line and at the current sinks connected to the X– line and Y– line to vary. The voltage variation will be proportional to the distance that the contact is from the peripheral edges of the touchpad where the X+ and Y+ lines and the X– and Y– lines are attached.

The voltages present at the connections of the current sinks connected to the X– and Y– lines are coupled 115 to a multiplexing analog-to-digital converter 130. These voltages are converted at regular timing intervals to a set of location digital codes 135 representing the amplitude of the voltages present at the connections of current sinks connected to the X– and Y– lines that indicate the location of the pointed object pressed on the touchpad 110 surface.

An embodiment of the multiplexing analog-to-digital converter is disclosed in pending application TMI96-021

(Ong) assigned to the same assignee as this invention and included here by reference.

The voltages 115 present at the connections of the current sources connected to the X+ and Y+ lines and the current sinks connected to the X− and the Y− lines are also coupled to the pressure sense circuit 150. The pressure sense circuit converts the voltages 115 to an analog pressure signal 155. The pressure sense signal is proportional to the magnitude of the force of the pointed object pressing upon the touchpad 110.

The pressure sense signal is an input to the multiplexing analog-to-digital converter 130 and will convert, at regular timing intervals, the pressure signal to a set of pressure digital codes 157 that represent the magnitude of the pressure sense signal.

The voltage 115 at the connection of the current sink X− is transferred to the pen detect circuit 140. The pen detect signal 145 is set to a first logic state when a change in the voltage 115 at the connection of the current sink X− indicates that there has been a pointed object pressed on the touchpad 110 surface. The pen detect signal 145 will assume a second state when the voltage 115 at the connection of the current sink X− indicates that there is no object pressed on the touchpad 110 surface.

Figure 4A:
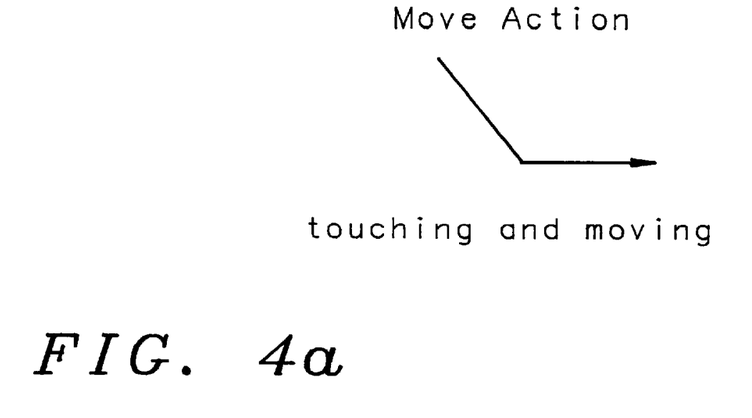
FIGS. 4a–4e are graphic sketches of the types of gestures recognized by the stroke interpreter of this invention.
Figure 4B:
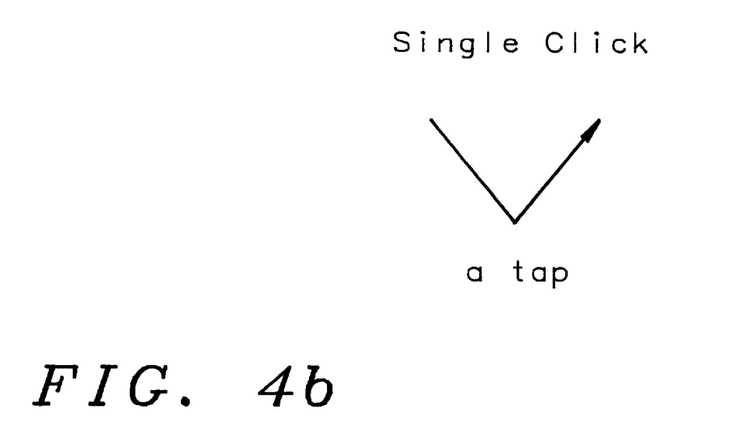
Figure 4C:
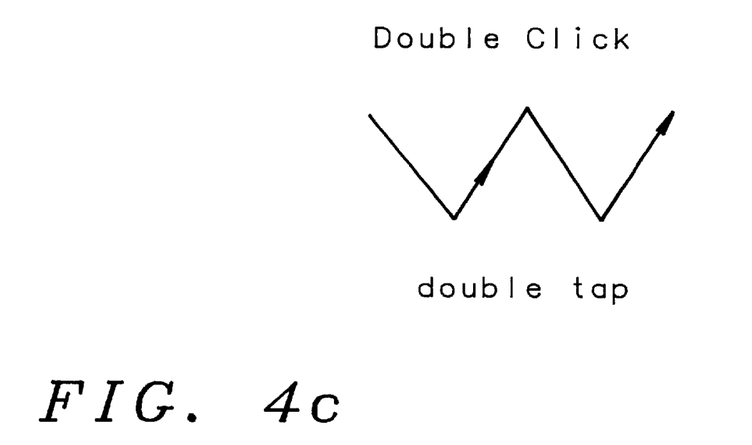
Figure 4D:
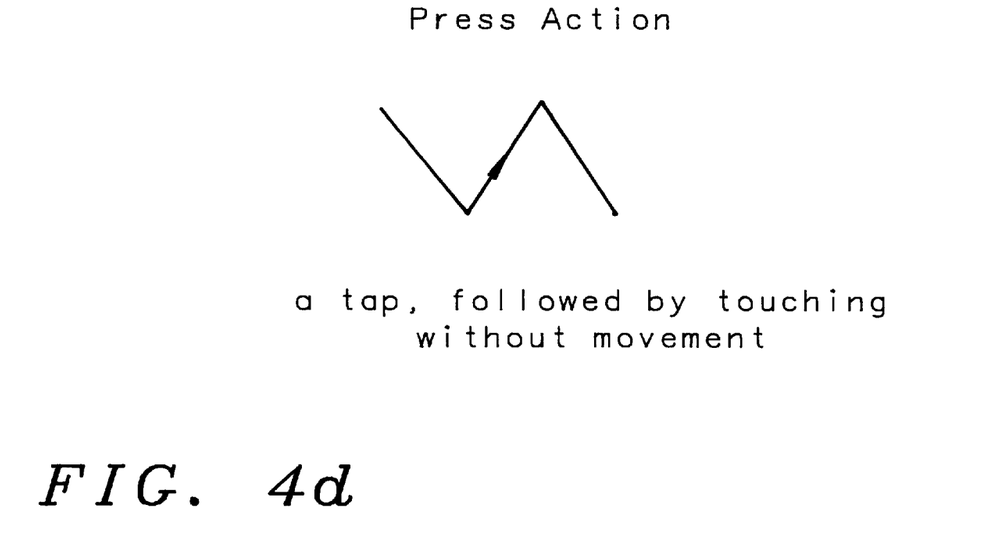
Figure 4E:
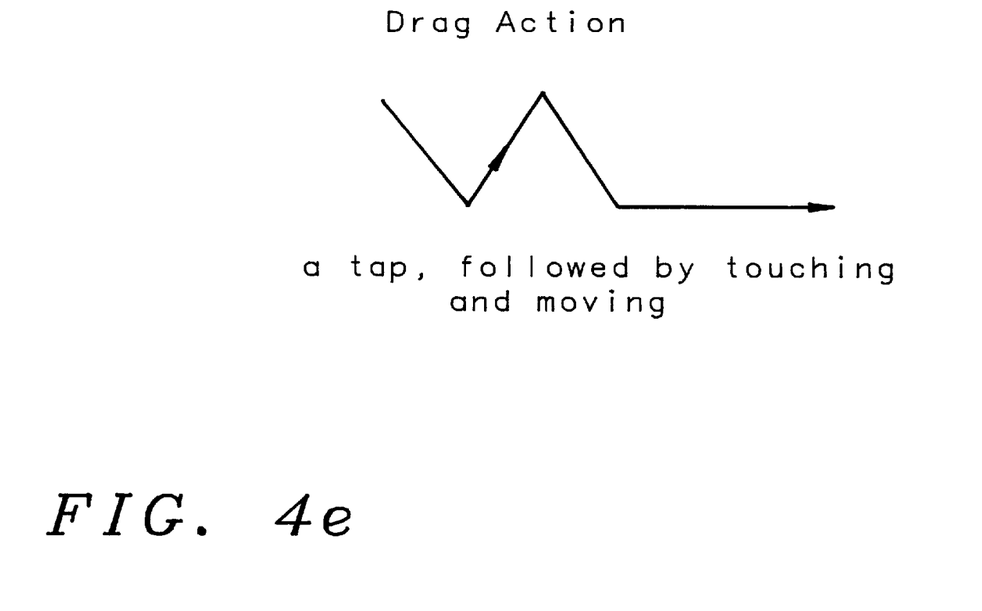

The pen detect signal 145 of the pen detect circuit 140 circuitry will be connected to the stroke interpreter 150. The stroke interpreter 150 will interpret the pen detect signal 145 to determine that certain gestures have been performed by the pointed object on the surface of the touchpad 110. The gesture include a touching and moving of the pointed object 110 upon the touchpad, a single tap of the pointed object upon the touchpad 110, a double tapping of the pointed object upon the touchpad 110, a single tap followed by a touching of the touchpad 110 by the pointed object without movement, and a single tap followed by a touching of the touchpad 110 by the pointed object with movement of the pointed object upon the touchpad 110. FIGS. 4a–4e shows the interpretation of the movements of the pointed object upon the touchpad. FIG. 4a shows the touch and move, where the pen detect signal changes from the second state to the first state. This will cause the cursor to move across the display screen. FIG. 4b shows a single tap where the pen detect signal will move from the second state to the first state and back the second state. These will be interpreted as equivalent to a single click of a mouse's primary button. FIG. 4c shows a double tap of the pointed object upon the surface of the touchpad. The pen detect signal will move from the second state to the first state, then return to the second state, back to the first state and then back to the second. The stroke interpreter will determine this motion to be equivalent to a double click of the primary button of a mouse. FIG. 4d shows a tap followed by a press with no movement. The pen detect signal will change from the second state to the first state, back to the second state and then returning to the first state where it will remain motionless. The stroke interpreter will interpret this motion as a click and press action of a mouse where the primary button of a mouse is pressed but the mouse is not moved. FIG. 4e shows a tap action followed by a press with movement of the pointed object upon the touchpad. The pen detect signal will change from the second state to the first state, back to the second state and then returning to the first state where the pointed object will then move. The stroke interpreter will interpret this motion as a click and press action of a mouse where the primary button of a mouse is pressed but the mouse is then moved.

The stroke interpreter 150 also can receive signals 152 and 156 from two physical buttons that maybe attached to the touchpad 110. These signals will be interpreted as the single and double clicks of the right 152 and left 156 mouse buttons.

The stroke signal 160 is the output of the stroke interpreter 150 and will contain the interpreted signals indicating the single and double "clicks", the "click and drag" and whether the right 152 and left 156 mouse buttons have been activated.

Figure 3B:
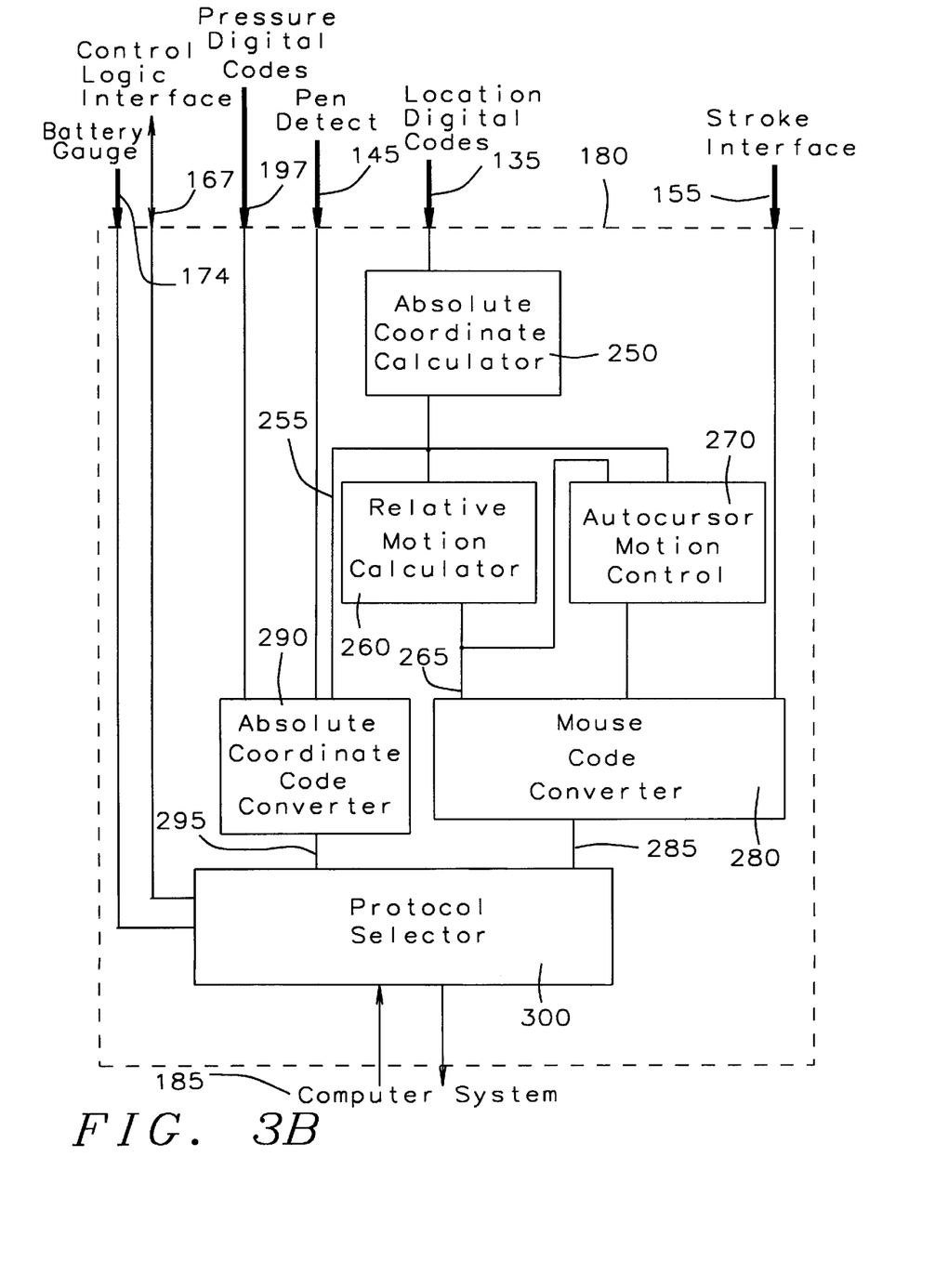
FIG. 3b is a schematic diagram of a touchpad computer system interface of this invention.

The location digital codes 135 also are transferred to the touchpad computer interface 180. Referring to FIG. 3b, the touchpad computer interface 180 has an absolute coordinate calculator 250 will average the location digital codes 135 to minimize the effects of rapid variations in the location digital codes 135 due to the fluctuations of the pointed object upon the touchpad 110 and as a result of electrical noise that emanates from circuitry in close proximity to the touchpad pen-input mouse controller. The averaged location digital codes 255 are converted in an absolute coordinate code converter 290 to a touchpad computer interface protocol 295 that describes the absolute coordinates of the pointed object upon the touchpad 110.

A method for the averaging of the location digital codes 135 is illustrated in pending application TMI96-011 (Ong, et al.) assigned to the same assignee as this invention and included here by reference.

The pressure digital codes 197 and the pen detect signal 145 are transferred to the absolute coordinate code converter 290 to be merged to the touchpad interface protocol 295. The averaged location digital codes and the pressure digital codes 157 are joined to form the following code:

This code may be transferred on an industry standard serial interface or by any other applicable interface.

The set of averaged location digital codes 255 are transferred to the relative motion calculator 260. The relative motion calculator 260 will record multiple sets of the averaged location digital codes 255 and calculate a set of relative motion digital codes 265 that are the speed and direction of the motion of the pointed upon the surface of the touchpad 110. The set of relative motion digital codes 185 are the difference of a current set of coordinate digital codes 175 and a previous set of coordinate digital codes 175. The first sampling of the set of coordinate digital codes 175 when the pointed object is first place upon the touchpad 110, does not generate a relative motion digital codes 185, but the second sampling of the set of coordinate digital codes 175 starts the streaming of the sets of relative motion digital codes 185.

The relative motion digital codes 265 and the averaged location digital codes 255 are transferred to the autocursor motion controller 270. The autocursor controller 270 is a selectable feature that when selected, will divide the touchpad 110 surface into a workzone and an edgezone. As shown in FIG. 4, the workzone 220 is the central area of the touchpad 110. The edgezone 230 is the area near the periphery of the touchpad 110. If the pointed is pressing the touchpad and transits with a certain speed greater than a speed threshold from the workzone into the edgezone, the autocursor motion control 270 of FIG. 3b will create a set of autocursor digital codes 275 that are the relative motion digital codes 265. The speed and direction as expressed by the relative motion digital codes 265 prior to the transiting from the workzone 220 to the edgezone 230 become constrained in speed and direction. The autocursor digital codes 275 will remain constant if the pointed object either is in the constrained direction and the constrained speed or is brought to a stop. The autocursor digital codes 275 can be changed within the edgezone 230 by moving the pointed object pressing upon the touchpad 110 at a new speed and direction. If the speed is to be changed but the direction, the pointed object should be moved at the new speed while maintaining the constrained direction. The autocursor digital codes 275 will be modified to increment the constrained speed to a new value. If the new speed and direction is required, the pointed object moves in the new direction for an amount sufficiently large so as to indicate a definite movement and not a random motion or wiggling of the human hand moving the pointed object upon the touchpad 110. The new direction and speed is captured from the relative motion digital codes 185 and the autocursor digital codes 275 is created indicating the new constrained speed and constrained direction. As an example if the pointed object were following the path 250 upon the touchpad 110 and a pointed object enters the edgezone 230, the pointed object may stop movement and the autocursor digital codes 275 would be generated as though the speed and motion were being maintained even though the pointed object may in fact have ceased movement. If a new direction or speed is desired the pointed object will move in the new direction at the new speed and the autocursor digital codes 275 will be modified to reflect the changes and the point object again can cease motion.

The autocursor motion control 270 will cease to generate the autocursor digital codes 275 if the pointed object transits from the edgezone 230 to the workzone 220 of the touchpad 110.

The stroke signal 155, the relative motion digital codes 265, and the autocursor digital codes 275 are transferred to the mouse code converter 280. The mouse code converter 280 will create from the stroke signal 155, the relative motion digital codes 265, and the autocursor digital codes 275, a mouse protocol 285 that conform to industry standard computer input mouse protocols. These protocols may those that conform to the Microsoft Corporation MS Mouse standard, the International Business Machines, Incorporated PS/2 Mouse standard, and the Apple Computer, Inc. Apple Desktop Bus an any other applicable computer input mouse protocol.

The touchpad computer interface protocol 295 and the mouse protocol 285 are be transferred to the protocol selector 300. The touchpad computer interface protocol 295 and the mouse protocol 285 will be buffered and converted to electrical signal levels that conform to the electrical specifications required of the interface between the touchpad-computer interface 180 and the computer system 185. If a mouse select command sent from the computer system 185 on the touchpad-computer interface 180 is set to a state that is to select the mouse protocols, the mouse protocols 285 are transferred to the computer system to the control the movement of the cursor on a display screen of the computer system. However, if the mouse select command is set to a state that is to select the touchpad computer interface protocol 295, the touchpad computer interface protocol 295 transferred to the computer system for further processing.

Returning to FIG. 3a, the battery 200 has a positive connector 192 and a negative connector 196 to deliver a voltage and current to the touchpad pen-input controller 100 and the computer system 185 through the power supply controller and regulator 190. The battery sense line 205 will sense the voltage and current of the battery 200. The battery sense line is an input of the multiplexing analog-to-digital converter 130. The multiplexing analog-to-digital converter 130. will create a battery power set of digital codes 172 that indicate the magnitude of the voltage and current of the battery 200.

The battery power set of digital codes 172 are transmitted to the battery gauge 170 which calculates a set battery condition digital codes 174. The battery condition digital codes 174 are an indication of the level of energy remaining within the battery 200 and the rate of consumption of the battery 200.

The battery condition digital codes 174 are transferred to the touchpad computer interface 180 to be transmitted to the computer system 185. The computer system will display the battery condition on the display screen to inform the user of the condition of the battery 200.

The autopower save circuit 160 will activate a power down signal 165 to the power supply control and regulator circuit 200 to remove the voltage and current from the circuits of the touchpad pen-input controller 100 if no pointed object is detected by the pen detect circuit 140 as being in contact with the touchpad surface 110 for a long period of time. The autopower save circuit 160 will deactivate the power down signal 165 to the logic control circuit 220. The logic control circuit 220 will deactivate the power control line 225 and the power supply control and regulator circuit 200 will return the voltage and current to the touchpad pen-input controller 100 if the pointed object is detected by the pen detect circuit 140 as being in contact with the touchpad surface 110. The autopower save circuit 160 will also deactivate the power down signal 165 to the logic control circuit 220 and the power supply control and regulator circuit 200 will return the voltage and current to the touchpad pen-input controller 100 if the computer system 185 activates a request to send line to the touchpad computer interface 180.

While this invention has been particularly shown and described with reference to the preferred embodiments thereof, it will be understood by those skilled in the art that various changes in form and details may be made without departing from the spirit and scope of the invention.

What is claimed is:

1. A battery powered touchpad digitizing computer input device to detect a presence of a pointed object upon a surface, and to convert said presence to a set of digital codes that indicate absolute location and force of said pointed object upon said surface, if a pen input mode is selected, and to convert said presence to a speed and direction set of digital codes that conform to industry standard computer input mouse protocols, if a mouse mode is selected, comprising a) a touchpad digitizer having a hard covering surface, a touch input transducer to convert said presence to electrical responses proportional to a distance of said pointed object from peripheral sides of said surface and proportional to the force of said pointed object upon said surface;

b) a touchpad driver circuit connected to said touchpad digitizer to provide an electrical stimulus to said touch input transducer;

c) a multiplexing analog-to-digital converter to accept a plurality of analog signals including the electrical responses and the pressure analog signal, and convert said plurality of analog signals to a plurality of digital codes that include a set of location digital codes representing the location of the pointed object upon the surface and a set of pressure digital codes representing the force of the pointed object upon the surface;

d) a pen detect circuit that receives the electrical responses to create a pen detect signal when said pointed object has been placed upon said touchpad digitizer;

e) a stroke interpreter to decode multiple occurrences the presence signal to create a stroke signal;

f) a touchpad computer interface connected to the multiplexed analog-to-digital converter, the pen detect circuit, and the stroke interpreter to receive and convert the location digital codes, the set of pressure digital codes, the pen detect signal, the stroke signal to a pen input protocol that contains an absolute location and pressure of said pointed object upon said touchpad digitizer and to transmit said protocol to a computer system for further processing if said pen-input mode is selected, and to convert the location digital codes, the pen detect signal, and the stroke signal to the computer input mouse protocols containing the relative motion and stroke information to control a cursor upon a display screen of said computer system, if the mouse mode is selected; and g) a mode selector to select the pen-input mode if a mode select signal is at a first state and to select the mouse mode if the mode select signal is a second state.

2. The input device of claim 1 wherein the electrical responses varies in magnitude according to the location of said pointed object upon said touchpad.

3. The input device of claim 1 wherein the pointed object is selected from the set of pointed objects including a human finger, a stylus, and a pen.

4. The input device of claim 1 wherein the electrical response selected from the set of electrical responses that include a change in voltage, a change in current, and a change in frequency of an oscillating signal.

5. The input device of claim 1 further comprising a pressure sense circuit to convert the electrical responses to a pressure analog signal proportional to said force of the pointed object upon said surface.

6. The input device of claim 1 further comprising:

a) a battery to provide a voltage and a current to said touchpad digitizing computer input device and to said computer system, wherein said battery has a battery sense line is included as one of the plurality of analog signals connected to said multiplexing analog-to-digital converter, and converted to a set of battery power digital codes indicating the level of the voltage and the current b) a battery gauge circuit to calculate from the battery power digital codes, a battery condition set of digital codes, which indicates a charging state of said battery, and to transmit said battery condition set of digital codes to the touchpad interface, wherein said touchpad-computer interface will transmit said battery condition set of digital codes to said computer system.

7. The input device of claim 1 wherein the touchpad computer interface comprises:

a) an absolute coordinate calculator to perform a method of coordinate averaging upon the location digital codes to create the absolute location digital codes that is a more consistent indication of the movement of the pointed object upon the touchpad digitizer;

b) a relative motion calculator to manipulate multiple sets of the location set of digital codes to create a relative motion set of digital codes that indicate the relative motion that is the speed and direction of the pointed object upon the touchpad;

c) an autocursor motion controller to interpret the absolute location set of codes to determine if said pointed object has transited between a workzone and an edgezone of said touchpad and to create an autocursor set of codes that contain the predefined relative motion set of digital codes to modify the autocursor set of codes if the location set of codes indicate that the pointed object is moving upon said touchpad in a new direction and at a new speed, to terminate the autocursor set of digital codes if the location set of codes indicates that the pointed object has transited from said edgezone to said workzone;

d) a mouse code conversion unit to convert the relative motion set of digital codes, the stroke signal, and the autocursor set of digital codes to the mouse movement set of digital codes;

e) a pen-input code conversion unit to convert the absolute location digital codes, the pressure digital codes, and the pen detect signal to the pen-input protocol; and f) a data interface to convert the mouse movement set of digital codes if the mouse mode is selected, and the pen-input protocol if the pen-input mode is selected, to electrical signals and to transmit said electrical signals to said computer system for further processing.

8. The input device of claim 1 wherein the stroke signal will have:

a) a move action value is presence signal become active indicating the pointed object is present on the touchpad and is moving;

b) a single click value if the presence signal is active for a brief period of time followed by the presence signal being inactive to indicate a single tap of the touchpad;

c) a double click value if the presence signal is active for the brief period of time followed by the presence signal being inactive for the brief period of time followed by the presence signal being active for the brief period of time and followed by the presence signal becoming inactive to indicate a double tapping of the touchpad;

d) a press value if the presence signal is active for a brief period of time followed by the presence signal becoming active for a long period of time with no movement of the pointed and the object upon the touchpad; and e) a press and drag value if the presence signal is active for the brief period of time followed by the presence signal being inactive for the brief period of time and followed by the presence signal becoming active for a long period of time to indicate a tap followed by the movement of the pointed object upon the touchpad.

9. The input device of claim 1 further comprising a power supply control and regulator circuit connected to said battery to control and regulate the voltage and the current.

10. The input device of claim 1 further comprising an autopower save circuit connected to the pen detect circuit to receive the pen detect signal, to interpret said pen detect signal to determine if said pointed object has not been in contact with the touchpad surface for a long period of time, and to create an autopower down signal that will be transferred to the power supply control and regulator circuit to command removal of the voltage and current from the touchpad input computer device and to restore said voltage and current if the pen detect signal indicates that the pointed object is in contact with the touchpad surface.

11. A touchpad digitizer computer input device control circuit to accept electrical response signals generated by a pointed object in contact with a touchpad digitizer, and to create a pen-input protocol if a pen-input mode is selected and to create a computer input mouse protocol if the mouse mode is selected, for transmission to a computer system for control of a cursor upon a display screen, to signal an end of stroke in handwriting recognition programs, and to provide stroke, location, and pressure information to signature entry and verification programs, comprising:

a) a touchpad driver circuit connected to said touchpad digitizer to provide an electrical stimulus to said touchpad digitizer;
  b) a multiplexing analog-to-digital converter to accept a plurality of analog signals including the electrical responses and the pressure analog signal, and convert said plurality of analog signals to a plurality of digital codes that include a set of location digital codes representing the location of the pointed object upon the surface and a set of pressure digital codes representing the force of the pointed object upon the surface;
  c) a pen detect circuit that receives the electrical responses to create a pen detect signal when said pointed object has been placed upon said touchpad digitizer;
  d) a data interface to convert to electrical signals the mouse movement set of digital codes if the mouse mode is selected, and the pen-input protocol if the pen-input mode is selected, and to transmit said electrical signals to said computer system for further processing;
  e) a stroke interpreter to decode multiple occurrences the presence signal to create a stroke signal; and
  f) a mode selector to select the pen-input mode if a mode select signal is at a first state, and to select the mouse mode if the mode select signal is at a second state.

12. The control circuit of claim 11 wherein the electrical responses varies in magnitude according to the location of said pointed object upon said touchpad.

13. The control circuit of claim 11 wherein the pointed object is selected from the set of pointed objects including a human finger, a stylus, and a pen.

14. The control circuit of claim 11 wherein the electrical response selected from the set of electrical responses that include a change in voltage, a change in current, and a change in frequency of an oscillating signal.

15. The control circuit of claim 11 further comprising a pressure sense circuit to convert the electrical responses to a pressure analog signal proportional to said force of the pointed object upon said surface.

16. The control circuit of claim 11 wherein the touchpad computer interface comprises:

a) an absolute coordinate calculator to perform a method of coordinate averaging upon the location digital codes to create the absolute location digital codes that is a more consistent indication of the movement of the pointed object upon the touchpad digitizer;
  b) a relative motion calculator to manipulate multiple sets of the location set of digital codes to create a relative motion set of digital codes that indicate the relative motion that is the speed and direction of the pointed object upon the touchpad;
  c) an autocursor motion controller to interpret the absolute location set of codes to determine if said pointed object has transited between a workzone and an edgezone of said touchpad and to create an autocursor set of codes that contain a predefined relative motion set of digital codes to modify the autocursor set of codes if the location set of codes indicate that the pointed object is moving upon said touchpad in a new direction and at a new speed, to terminate the autocursor set of digital codes if the location set of codes indicates that the pointed object has transited from said edgezone to said workzone;
  d) a mouse code conversion unit to convert the relative motion set of digital codes, the stroke signal, and the autocursor set of digital codes to the mouse movement set of digital codes;
  e) a pen-input code conversion unit to convert the absolute location digital codes, the pressure digital codes, and the pen detect signal to the pen-input protocol; and
  f) a data interface to convert the mouse movement set of digital codes if the mouse mode is selected, and the pen-input protocol if the pen-input mode is selected, to electrical signals and to transmit said electrical signals to said computer system for further processing.

17. The control circuit of claim 11 wherein the stroke signal will have:

a) a move action value is presence signal become active indicating the pointed object is present on the touchpad and is moving;
  b) a single click value if the presence signal is active for a brief period of time followed by the presence signal being inactive to indicate a single tap of the touchpad;
  c) a double click value if the presence signal is active for the brief period of time followed by the presence signal being inactive for the brief period of time followed by the presence signal being active for the brief period of time and followed by the presence signal becoming inactive to indicate a double tapping of the touchpad;
  d) a press value if the presence signal is active for a brief period of time followed by the presence signal becoming active for a long period of time with no movement of the pointed and the object upon the touchpad; and
  e) a press and drag value if the presence signal is active for the brief period of time followed by the presence signal being inactive for the brief period of time and followed by the presence signal becoming active for a long period of time to indicate a tap followed by the movement of the pointed object upon the touchpad.

18. The control circuit of claim 11 further comprising:

a) a battery to provide a voltage and a current to said touchpad digitizing computer input device and to said computer system, wherein said battery has a battery sense line is included as one of the plurality of analog signals connected to said multiplexing analog-to-digital converter, and converted to a set of battery power digital codes indicating the level of the voltage and the current
  b) a battery gauge circuit to calculate from the battery power digital codes, a battery condition set of digital codes, which indicates a charging state of said battery, and to transmit said battery condition set of digital codes to the touchpad interface, wherein said touchpad-computer interface will transmit said battery condition set digital codes to said computer system.

19. The control circuit of claim 11 further comprising a power supply control and regulator circuit connected to said battery to control and regulate the voltage and the current.

20. The control circuit of claim 11 further comprising an autopower save circuit connected to the pen detect circuit to receive the pen detect signal, to interpret said pen detect signal to determine if said pointed object has not been in contact with the touchpad surface for a long period of time, and to create an autopower down signal that will be transferred to the power supply control and regulator circuit to command selective removal of the voltage and current from the touchpad input computer device and to restore said voltage and current if the pen detect signal indicates that the pointed object is in contact with the touchpad surface.

* * * * *